(12) United States Patent
Azuma

(10) Patent No.: US 7,197,298 B2
(45) Date of Patent: Mar. 27, 2007

(54) RADIO-COMMUNICATION TERMINAL DEVICE THAT PREVENTS COMMUNICATION THROUGH AN UNAUTHENTICATED ANTENNA

(75) Inventor: Toshiyuki Azuma, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 513 days.

(21) Appl. No.: 10/828,152

(22) Filed: Apr. 20, 2004

(65) Prior Publication Data
US 2004/0214532 A1    Oct. 28, 2004

(30) Foreign Application Priority Data
Apr. 23, 2003 (JP) .............................. 2003-119037

(51) Int. Cl.
  H04M 1/66     (2006.01)
  H04B 1/034    (2006.01)
  H04B 7/00     (2006.01)
(52) U.S. Cl. ..................... 455/411; 455/575.7; 455/95; 455/269
(58) Field of Classification Search ................ 455/411, 455/562.1, 565, 575.1, 575.7, 90.2, 95, 269, 455/348, 349
See application file for complete search history.

(56) References Cited

U.S. PATENT DOCUMENTS 6,721,556 B2 * 4/2004 Tezuka et al. .............. 455/411
7,039,392 B2 * 5/2006 McCorkle et al. .......... 455/411
7,072,691 B2 * 7/2006 Cromer et al. ............. 455/558
2003/0065952 A1 * 4/2003 Otsuka ....................... 713/201
2004/0127247 A1 * 7/2004 Reece et al. ............. 455/550.1

FOREIGN PATENT DOCUMENTS

| JP | 04-326818 | 11/1992 |
| JP | 09-148958 | 6/1997 |
| JP | 2920574 | 4/1999 |

* cited by examiner

Primary Examiner—Tony T. Nguyen
(74) Attorney, Agent, or Firm—Brinks Hofer Gilson & Lione

(57) ABSTRACT

A radio-communication terminal device having an antenna unit incorporating an antenna element and an authenticator for authenticating the connected antenna element, and a transceiver unit that includes a transmission circuit, a reception circuit, an authentication detector and a communication controller. The antenna unit further includes a first antenna connector and a first connector. The transceiver unit includes a second connector that connects to the first connector when the first antenna connector connects to the second antenna connector. The authentication detector detects the authentication of the authenticator when the first connector is connected to the second connector. The communication controller prevents the transmission circuit from transmitting signals when the authenticator cannot authenticate the connection to the antenna unit.

36 Claims, 3 Drawing Sheets

RADIO-COMMUNICATION TERMINAL DEVICE THAT PREVENTS COMMUNICATION THROUGH AN UNAUTHENTICATED ANTENNA

BACKGROUND OF THE INVENTION

This application claims the benefit of Japanese Patent Application No. 2003-119037, filed on Apr. 23, 2003, which is incorporated herein by reference.

1. Field of the Invention

The present invention relates to radio-communication terminals used for data transmission and are capable of determining whether an unauthenticated antenna is connected to the terminal.

2. Description of the Related Art

FIG. 4 is a circuit diagram showing the structure of a known radio-communication terminal. Referring to FIG. 4, an antenna 31 is grounded for direct current through a high-frequency coil 32. The main body of the radio-communication terminal device has a transmission control circuit 35 that has two subsystems: a current detection circuit 33 and a signal output circuit 34. The current detection circuit 33 applies a DC voltage to an antenna connector 36 to determine whether the antenna is connected to the transceiver unit. If the current detection circuit 33 detects a flow of DC current, a transmission signal (high-frequency signal) is supplied from a transmission circuit (not shown) to the antenna connector 36. If the current detection circuit 33 does not detect the DC current, the transmission control circuit 35 determines that the antenna 31 is not connected to the antenna connector 36. The signal output circuit 34 outputs a transmission inhibiting signal, thus preventing the transceiver from transmitting a signal (See for example, Japanese Unexamined Patent Application Publication No. 4-326818).

In the arrangement of the known radio-communication terminal, if the antenna 31 is connected to the antenna connector 36, the transmission control circuit 35 will sense that the antenna 31 is connected to the antenna connector 36 because the current detection circuit 33 detects the DC current, and the transmission circuit will transmit a signal. However, there may be times when the connected antenna 31 does not meet the standards for the transmission circuit because of load balancing factors, or for example, the gain of the antenna 31 may be too large for a given transmitter. If such a radio terminal were allowed to transmit, power levels exceeding those allowed by law may occur and those transmissions may interfere with other receivers and other sensitive electronic devices.

BRIEF SUMMARY

Accordingly, a radio-communication terminal is provided that prevents transmissions which may interfere with receivers and other devices that are susceptible to radio frequency interference. This invention may prevent legal problems, from both regulatory agencies and those who own equipment which is affected by any unauthorized high power signals, especially those caused by the connection of an unauthorized antenna to a transmitter.

In one embodiment of the present invention, a radio-communication terminal device includes a transceiver unit and an antenna unit. The transceiver unit includes a transmission circuit, a reception circuit, an authentication detector, and a communication controller. The antenna unit includes an antenna element that may be connected to the transmission and reception circuits when the antenna unit is mounted to the transceiver, and an authenticator for indicating that the connection of the antenna element to the transmitter and the receiver is authorized. The authentication detector in the transceiver may determine whether the authenticator is identified, and if so, will authenticate the connection by sending a signal to the communication controller. Otherwise, the communication controller in the transceiver disables communications if the authenticator is not identified when connection to the antenna is made. In this arrangement, the radiation of power levels resulting from the use of unauthorized and unspecified antennas exceeding the regulatory limits may be prevented. Thus, the prevention of radio interference with other electronic devices is accomplished.

The authenticator in the antenna unit may be a first memory chip that stores information that positively identifies the antenna element. The first memory chip may be a flash memory chip or even a DIP-type switch where an identifying or authenticating code may be implanted into the antenna unit. The transceiver may include a second memory device or DIP-type switch that stores the same identifying or authenticating information which is contained in the antenna unit. The authentication detector in the transceiver unit may compare the information received from the memory in the antenna unit with the information in the memory of the transceiver to determine whether the authenticator is identified based on the compared result. In this embodiment, storing the authentication information in the first and second memories allows the authentication detector to read and compare the information stored in the memories.

In another embodiment, the transceiver may include a memory writer that writes information to the first memory and then writes the same identifying information to a second memory located within the transceiver unit. In this arrangement, the transceiver may be used with multiple antenna units.

The antenna unit may include two connectors. One connector may be designated as the first antenna connector and is attached to the antenna element. The other connector may be designated as the first connector and is connected to the authenticator or the first memory. The transceiver may have two corresponding connectors. One connector may then be designated as the second antenna connector and connect to the first antenna connector on the antenna unit and to the transmission circuit and reception circuit in the transceiver unit. The other connector may be designated as the second connector and connect to the first connector on the antenna unit and to the authentication detector and the memory writer, if there is one, in the transceiver unit. In such an arrangement, it is possible to separate the authentication information from the transmission and reception signals and to communicate the authentication information between the antenna unit and the transceiver unit through separate connections.

In another embodiment, the antenna unit may include just one connector, the first antenna connector, which connects to the antenna element and to a first modulator-transmitter and a first receiver-demodulator that may be contained within the antenna unit for accomplishing the authentication and identification of the antenna unit. The transceiver unit has a second antenna connector that connects to the transmission and reception circuits and it may also connect to a second modulator-transmitter and a second receiver-demodulator that may be contained within the transceiver unit. In the antenna unit, the first modulator-transmitter and the first receiver-demodulator may be connected to the authenticator or a memory that comprises the authenticator. In the transceiver unit, the second modulator-transmitter may be connected to a memory writer, if one is included, and the second receiver-demodulator may be connected to the authentication detector. In this particular embodiment, the authentication or identifying information may be communicated through the first and second antenna connectors, thus realizing a compact antenna and transceiver radio-communication unit.

In a further embodiment, the antenna unit may include a rectifier that is connected to the first antenna connector and is placed between the first antenna connector and the components that include the memory, the first modulator-transmitter, and the first receiver-demodulator. Since the power provided by the transceiver unit now eliminates the need for a battery in the antenna unit, a reduction in the size and cost of the antenna unit may be achieved.

In another embodiment of the radio communication terminal, the antenna unit will have a first antenna connector that connects to the antenna element. The transceiver unit will have a second antenna connector that connects to the transmission and reception circuits, and it may also connect to the authentication detector. The second antenna connector on the transceiver unit will also connect to the first antenna connector on the antenna unit. This embodiment also provides that the authenticator may be a conductor or wire that is connected between two terminals in the first connector of the antenna unit.

Additionally, it is possible that the two terminals are selected from a choice of several terminals in the first connector. In this case, the second connector in the transceiver may have two terminals that are connected to the corresponding terminals in the first connector of the antenna unit that are in turn connected to the authenticator. The authentication detector is connected to one of the terminals in the second connector in the transceiver unit and a DC voltage is applied to another terminal of the second connector. If the authentication detector receives the DC voltage, then a proper connection between the antenna unit and the transceiver unit is authenticated and the transceiver is allowed to communicate using that antenna unit. If the voltage is not sensed by the authentication detector, then the communication controller prevents communication through the antenna unit. In this embodiment, it is possible to determine an authentication or identification of the antenna unit with a simple radio-communication terminal device.

DETAILED DESCRIPTION OF THE DRAWINGS AND THE PRESENTLY PREFERRED EMBODIMENTS

Figure 1:
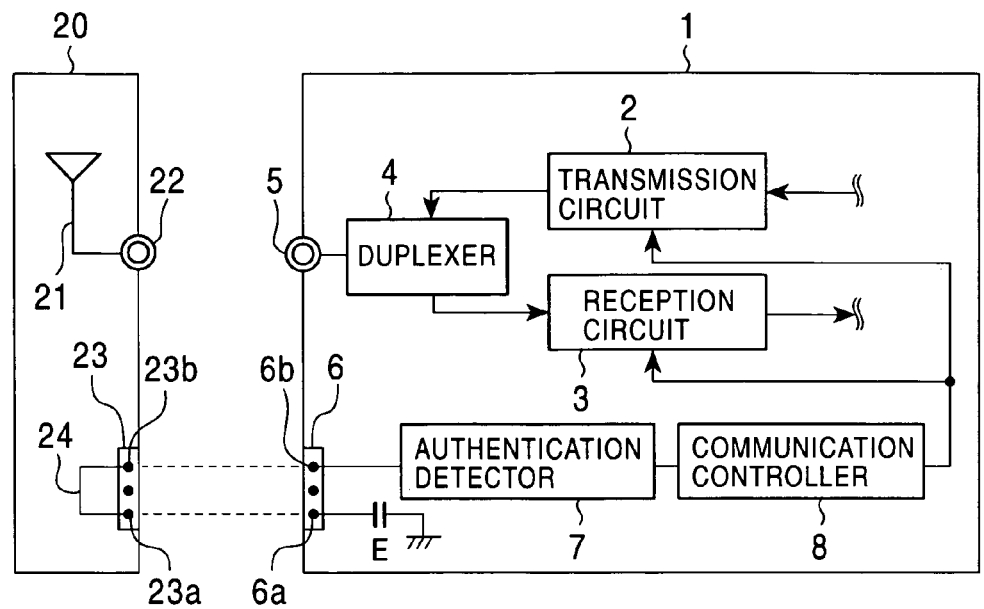
FIG. 1 is a block diagram showing the structure of a radio-communication terminal device according to one embodiment of the present invention.

A radio-communication terminal device of the present invention may provide data transmission by using, for example, the code division multiple access (CDMA) technology. FIG. 1 illustrates the structure of a radio-communication terminal device according to one embodiment of the present invention. First, the structure of a transceiver unit 1 will be described.

Referring to FIG. 1, a transmission circuit 2 and a reception circuit 3 are connected to a second antenna connector 5 through a duplexer 4. Each base-band processing circuit (not shown) is provided upstream from the transmission circuit 2 and downstream from the reception circuit 3, and transmits and receives data to and from the transmission circuit 2 or the reception circuit 3, respectively. The second antenna connector 5 may be, for example, a coaxial connector, which is mounted on one side face of the transceiver unit 1. A second connector 6 is mounted on the same side-face as the second antenna connector 5. The second connector 6 has three or more terminals and, among the terminals, a first terminal 6a and a second terminal 6b are used. For example, a DC-voltage E is applied to the first terminal 6a and an authentication detector 7 is connected to the second terminal 6b.

The authentication detector 7 senses whether the DC voltage is applied to the second terminal 6b, so that it may output a signal voltage to the communication controller 8. The communication controller 8 is connected to the authentication detector 7. The communication controller 8 controls the operation of the transmission circuit 2 and the reception circuit 3 based on the voltage supplied from the authentication detector 7. For instance, in one application when a high-level voltage is supplied from the authentication detector 7, the communication controller 8 may permit the transmission circuit 2 and the reception circuit 3 to communicate with other terminal devices via the antenna unit 20. When a low-level voltage is supplied from the authentication detector 7, the communication controller 8 may prevent communication by the transmission circuit 2. In addition, the communication controller 8 may prevent the reception circuit 3 from receiving signals.

The structure of an antenna unit 20 may be such that an antenna element 21 connected to the transceiver unit 1 is arranged in the antenna unit 20 so that it is not easily or externally altered. Further, when the antenna element 21 is connected, it will be authenticated by the transceiver unit 1. The antenna element 21 is connected to a first antenna connector 22 mounted on one side-face of the antenna unit 20. The first antenna connector 22, which may be a coaxial connector, is connected to the second antenna connector 5 in the transceiver unit 1.

A first connector 23 is mounted on the same-side face of the antenna unit 20 as the first antenna connector 22. The first connector 23, which has three or more terminals, is connected to the second connector 6 at the same time the second antenna connector 5 is connected to the first antenna connector 22. Each terminal in the first connector 23 is connected to the corresponding terminal in the second connector 6. A conductor 24, which may indicate that the antenna element 21 is authenticated or correctly connected, is connected to a first terminal 23a and a second terminal 23b among the terminals in the first connector 23. The first terminal 23a is connected the first terminal 6a in the second connector 6 and the second terminal 23b is connected to the second terminal 6b in the second connector 6. Accordingly, connecting the second connector 6 to the first connector 23 connects the conductor 24, or authenticator, between the first terminal 6a and the second terminal 6b in the second connector 6.

In the embodiment described above, mounting an antenna unit 20 having an authenticated antenna element 21 to the transceiver unit 1 connects the second antenna connector 5 to the first antenna connector 22 and the second connector 6 to the first connector 23. A voltage applied to the authentication detector 7 received from the authenticator 24 may permit the transmission circuit 2 and the reception circuit 3 to communicate with other devices through the antenna unit.

However, if an antenna element of an unauthorized antenna unit that is configured for a large transmission power is intentionally connected to the second antenna connector 5 on the transmitting-receiving unit 1, the conductor 24, which is the authenticator, may not be configured correctly for connecting to this second connector 6, thus preventing the authentication detector from detecting the DC voltage. With a multitude of terminals in the first connector, even when another first connector 23 connects to the second connector 6, it becomes improbable that the conductor 24 will be connected to the proper terminals in the first connector so that the connected terminals will correspond to the proper terminals in the second connector. The probability that an improper connection can be made decreases as the number of terminals in the second connector 6 and the first connector 23 increases.

In a further embodiment, the single conductor 24 may be multiple conductors such as that found in a code plug or a series of parallel switches that can be turned on and off such as those found in a DIP-type switch. In this configuration, communications using an unauthenticated antenna element are much more likely to be prevented.

Figure 2:
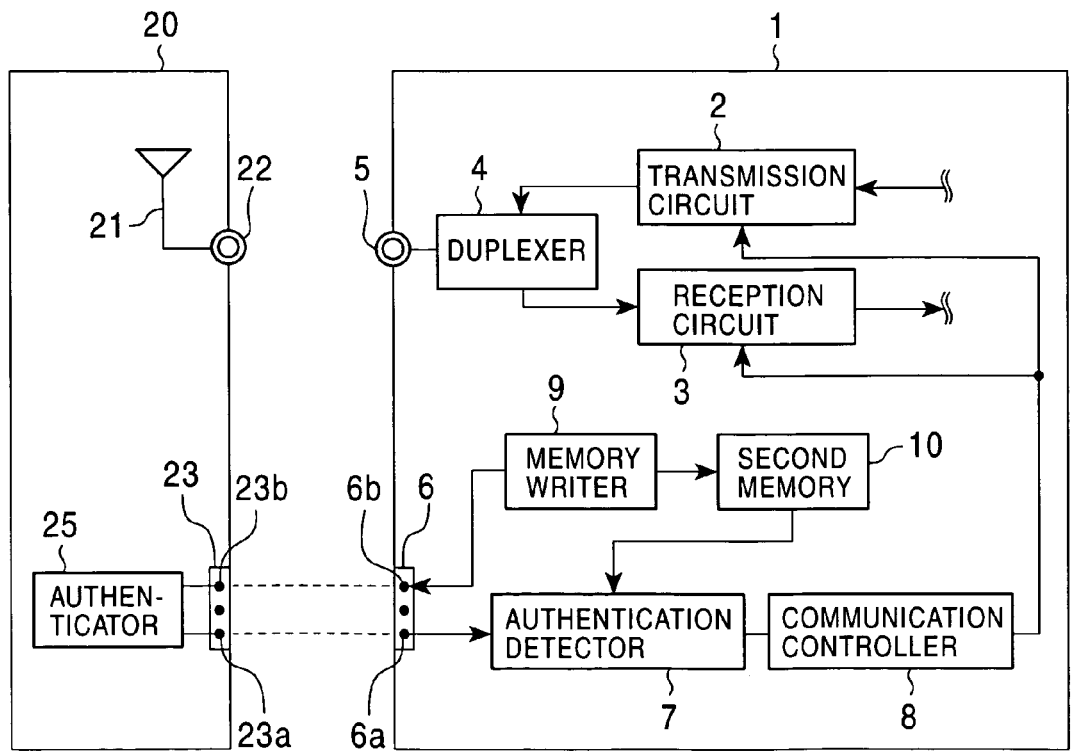
FIG. 2 is a block diagram showing the structure of a radio-communication terminal device according to a second embodiment of the present invention.

FIG. 2 is a block diagram showing the structure of a radio-communication terminal device according to another embodiment of the present invention. The same reference numerals are used in FIG. 2 to identify the same components as in FIG. 1 and the description from above is omitted here. Referring to FIG. 2, the antenna unit 20 may further include a first memory 25, which will act as the authenticator. It is also possible in this embodiment that the first memory can be implemented by the use of the code plug or the DIP-type switch described in the previous embodiment. For illustrative purposes, the first memory 25 is connected to the first terminal 23*a* and the second terminal 23*b* in the first connector 23, but may be connected to more terminals. The first memory 25 stores a first information that is used for identifying the antenna element 21. The first information includes authentication information indicating that the connection to the transmission circuit 2 and the reception circuit 3 is permitted and authenticated, in addition to the information concerning the antenna element 21, such as a type name or serial number of the antenna element 21. Although the first information may be written by a dedicated writing device (not shown) to the first memory 25, it may also be written by a memory writer 9 in the transceiver unit 1. Accordingly, the transceiver unit 1 can function as a writing device for writing the first information to the authenticator for meeting the appropriate standards.

The transceiver unit 1 in FIG. 2 further includes both the memory writer 9 and a second memory 10. The memory writer 9 writes second information used for identifying the authenticated antenna elements for the transceiver to the second memory 10. This means that the second information may include information concerning the authentication of multiple antenna elements, in addition to the first information. The second information is read by the authentication detector 7 for comparison with the first information. For illustrative purposes in FIG. 2, the authentication detector 7 is connected to the first terminal 6*a* in the second connector 6, and the memory writer 9 is connected to the second terminal 6*b* in the second connector 6. There may be more than two terminals involved in the connector to carry-out the functions.

With the arrangement described above, mounting the antenna unit 20 having the authenticated antenna element 21 to the transceiver unit 1 connects the second antenna connector 5 to the first antenna connector 22 and connects the second connector 6 to the first connector 23. Prior to the start of any transmission or reception, a control unit (not shown) switches the radio-communication terminal device to an authentication detection mode to indicate whether the antenna element 21 has been authenticated. The authentication takes place as follows.

First, the authentication detector 7 reads the first information written in the first memory 25 and the second information written in the second memory 10 and compares the first information with the second information. If the first information coincides with the corresponding part of the second information, the authentication detector 7 sends a signal for permitting communication to the communication controller 8. Accordingly, if the information in the first memory 25 is different than the corresponding part of the second memory, the authentication detector will sense the difference and the communication may be prevented by the communication controller. Alternatively, if the first memory 25 has no stored information, the communication will also be prevented. Since an antenna unit 20 having an unauthenticated antenna element 21 ordinarily does not incorporate a proper first memory or an authenticator 25 for the selected transceiver unit 1, communications through the unauthenticated antenna element 21 may also be prevented.

Further, the second memory 10 stores the second information having authentication information about other antenna elements 21 that may be used for identifying the other authenticated antenna elements 21 for the transceiver unit 1. Hence, even when an antenna unit 20 has a different authenticated antenna element 21, communications still may be permitted if the first information in the first memory 25 of the antenna unit 20 can be successfully compared to the second memory 10 in the transceiver unit 1.

Figure 3:
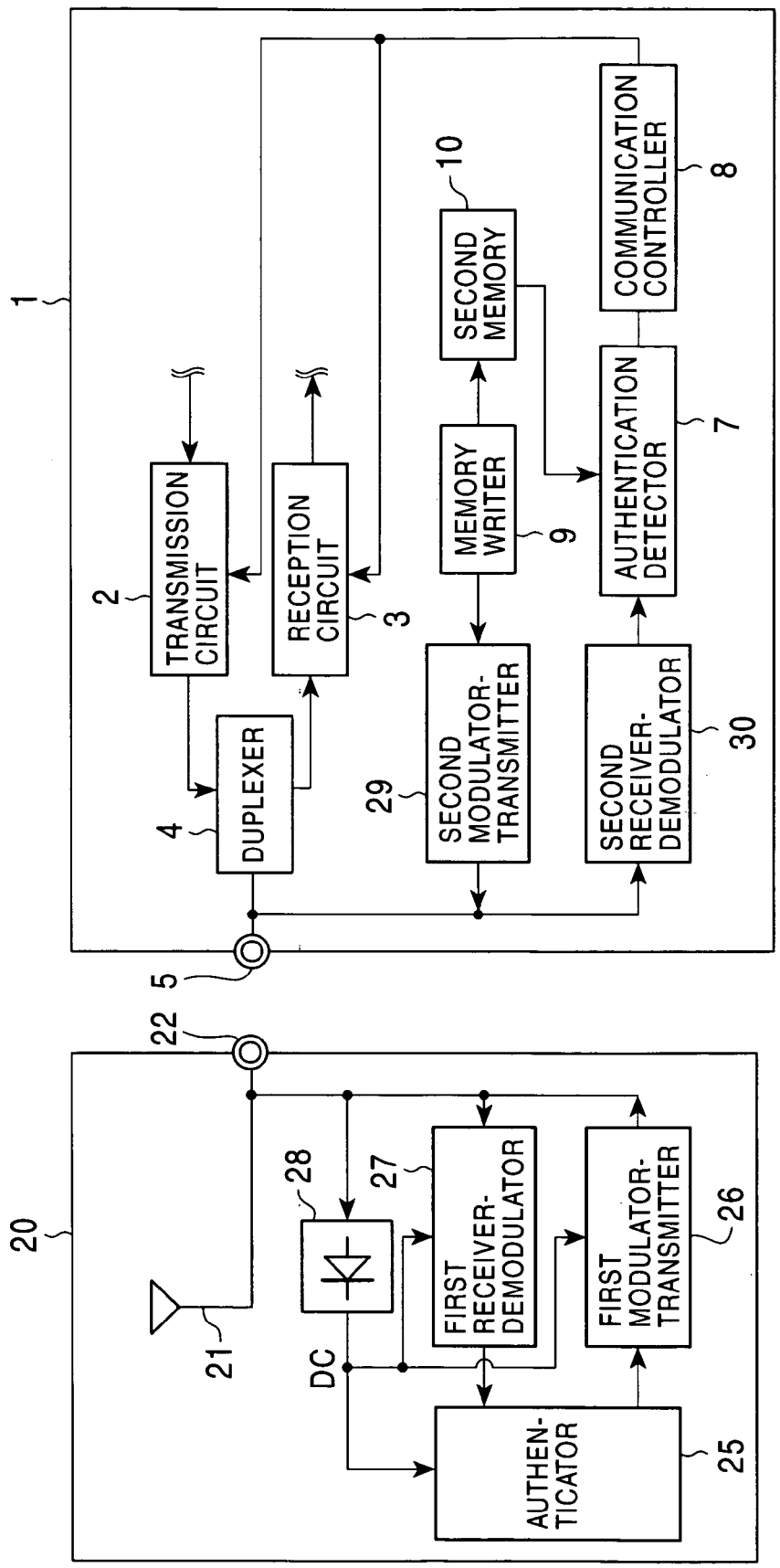
FIG. 3 is a block diagram showing the structure of a radio-communication terminal device according to a third embodiment of the present invention.
Figure 4:
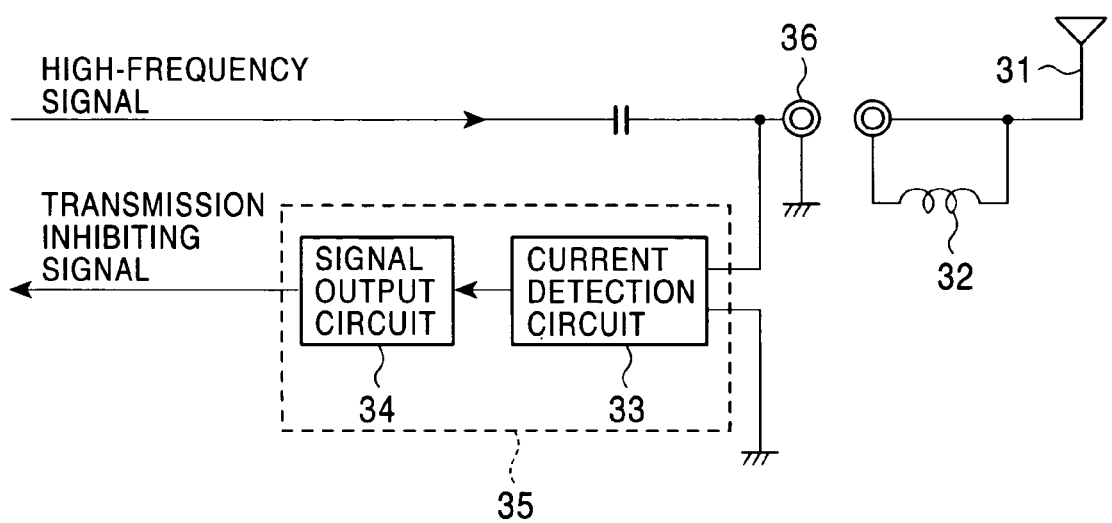
FIG. 4 is a block diagram showing the structure of a known radio-communication terminal device.

FIG. 3 is a block diagram showing the structure of a radio-communication terminal device according to another embodiment of the present invention. The same reference numerals that were used in FIGS. 1 and 2 are used in FIG. 3. In this embodiment, the antenna unit 20 includes a first modulator-transmitter 26, a first receiver-demodulator 27, and a rectifier 28. The input terminal of the first modulator-transmitter 26 is connected to the first memory 25 and the output terminal is connected to the first antenna connector 22. The input terminal of the first receiver-demodulator 27 is connected to the first antenna connector 22 and the output terminal is connected to the first memory 25. The input terminal of the rectifier 28 is connected to the first antenna connector 22 and the output terminal is connected to the respective power-supply terminals of the first memory 25, the first modulator-transmitter 26, and the first receiver-demodulator 27.

The transceiver unit 1 in FIG. 3 also includes a second modulator-transmitter 29 and a second receiver-demodulator 30. The input terminal of the second modulator-transmitter 29 is connected to the memory writer 9 and the output terminal is connected to the second antenna connector 5. The input terminal of the second receiver-demodulator 30 is connected to the second antenna connector 5 and the output terminal is connected to the authentication detector 7.

In the embodiment described above, when the antenna unit 20 is mounted to the transceiver unit 1, the second modulator-transmitter 29 in the transceiver unit 1 modulates high-frequency signals with the first information supplied from the memory writer 9, and transmits the modulated high-frequency signals, which are supplied to the first receiver-demodulator 27 through the second antenna connector 5 and the first antenna connector 22. The first receiver-demodulator 27 demodulates the input high-frequency signals to extract the first information, which was stored in the first memory 25. The transceiver unit 1 may have previously stored the first information for multiple antenna units 20 as second information, so that at a later time, the transceiver may detect if it is one of these antenna units that is mounted to the transceiver through the authentication process. As in a previous embodiment, the second memory 10 may contain the second information for the multiple antenna units 20. Thus, more than one antenna unit 20 may be configured for the transceiver unit 1.

As in the embodiment of FIG. 2, prior to the start of transmission and/or reception, a control unit (not shown) switches the radio-communication terminal device to an authentication detection mode to determine whether the antenna element 21 that is mounted to the transceiver has been previously authenticated. The first modulator-transmitter 26 modulates high-frequency signals with the first information read from the first memory 25, and transmits the modulated high-frequency signals to the second receiver-demodulator 30 through the first antenna connector 22 and the second antenna connector 5. The second receiver-demodulator 30 demodulates the high-frequency signals to extract the first information, which is supplied to the authentication detector 7. The authentication detector 7 compares the second information supplied from the second memory 10 with the first information to indicate whether the authentication and the connection are proper.

Since the first information is written in the first memory 25 through the second antenna connector 5 and the first antenna connector 22, the need for a dedicated first connector 23 and second connector 6 is eliminated, thus realizing a compact antenna unit 20 and transceiver unit 1. The provision of the rectifier 28 in the antenna unit 20 permits DC-power to be supplied to the first memory 25, the first modulator-transmitter 26, and the first receiver-demodulator 27.

In a further embodiment, the second modulator-transmitter 29 may be provided with a scrambling function and the second receiver-demodulator 30 with a descrambling function. With such an encryption process, security can be provided in the authentication process.

As one reviews the foregoing description, other embodiments may become evident or obvious to one who is skilled in the art. It is therefore intended that the foregoing detailed description be regarded as illustrative rather than limiting, and that it be understood that it is the following claims, including all equivalents, that are intended to define the spirit and scope of this invention.

The invention claimed is:

1. A radio-communication terminal device comprising:
   an antenna unit that includes:
      an antenna element for transmitting and receiving radio signals; and
      an authenticator for indicating an authentication of the antenna unit; and
   a transceiver unit that includes:
      a transmission circuit that transmits radio signals to the antenna unit;
      a reception circuit that receives radio signals from the antenna unit;
      an authentication detector that determines whether the authenticator indicates the authentication of the antenna unit; and
      a communication controller for preventing communication through the antenna unit when the authentication detector does not indicate the authentication.

2. A radio-communication terminal device according to claim 1,
   wherein the authenticator comprises a first memory that stores first information regarding the antenna element,
   the transceiver unit further includes a second memory that stores second information which includes the first information, and
   the authentication detector compares the first information from the first memory with the second information from the second memory to determine whether the authenticator indicates the authentication.

3. A radio-communication terminal device according to claim 2, wherein the transceiver unit further includes a memory writer that writes the first information in the first and second memories.

4. A radio-communication terminal device according to claim 3,
   wherein the antenna unit further includes:
      a first antenna connector connected to the antenna element, and
      a first connector connected to the first memory; and
   the transceiver unit further includes:
      a second antenna connector that is connected to the transmission circuit and the reception circuit and connects to the first antenna connector, and
      a second connector that is connected to the authentication detector and the memory writer and connects to the first connector.

5. A radio-communication terminal device according to claim 3,
   wherein the antenna unit further includes a first antenna connector connected to the antenna element and to a first modulator-transmitter and a first receiver-demodulator, and
   the transceiver unit includes:
      a second antenna connector that is connected to the transmission circuit and the reception circuit and connects to the first antenna connector; and
      a second modulator-transmitter and a second receiver-demodulator that are connected to the second antenna connector, wherein the first modulator-transmitter and the first receiver-demodulator are connected to the first memory, the second modulator-transmitter is connected to the memory writer, and the second receiver-demodulator is connected to the authentication detector.

6. A radio-communication terminal device according to claim 5, wherein the antenna unit further includes a rectifier, connected to the first antenna connector, for feeding power to the first memory, the first modulator-transmitter, and the first receiver-demodulator.

7. A radio-communication terminal device according to claim 1,
   wherein the antenna unit further includes:
      a first antenna connector connected to the antenna element; and
      a first connector having a plurality of terminals connected to the authenticator; and the transceiver unit further includes:
- a second antenna connector that is connected to the transmission circuit and the reception circuit and is connected to the first antenna connector; and
- a second connector having a plurality of terminals that is connected to the authentication detector and is connected to the first connector, wherein the authenticator is a conductor that is connected between at least two terminals in the first connector, and the second connector has at least two terminals connected to the two terminals in the first connector, the authentication controller being connected to a first terminal of the two terminals in the second connector and a DC-voltage being applied to a second terminal of the two terminals in the second connector.

8. A radio-communication terminal device comprising:
an antenna unit including an antenna element and an authenticator that indicates an authentication; and
a transceiver unit connecting to the antenna unit that includes a transmission circuit, a reception circuit, an authentication detector that detects the authentication of the antenna unit after receiving information from the authenticator, and a communication controller that prevents communications when the authentication controller does not authenticate the antenna unit.

9. A radio-communication terminal device according to claim 8, wherein the authenticator is a memory.

10. A radio-communication terminal device according to claim 8, wherein the authenticator is a plurality of conductors.

11. A radio-communication terminal device according to claim 8, wherein the authenticator is a series of switches.

12. A radio-communication terminal device according to claim 8, wherein the authentication controller compares the information in the authenticator to information within the transceiver unit.

13. A radio-communication terminal device according to claim 8, wherein the antenna unit further comprises a first antenna connector connected to the antenna element and a first connector connected to the authenticator.

14. A radio-communication terminal device according to claim 13, wherein the authenticator is a conductor and is connected between at least two terminals selected from a plurality of terminals in the first connector.

15. A radio-communication terminal device according to claim 12, wherein the first antenna connector connects to a second antenna connector on the transceiver unit which is connected to the transmission circuit and the reception circuit.

16. A radio-communication terminal device according to claim 12, wherein the first connector connects to a second connector on the transceiver unit which is connected to the authentication detector.

17. A radio-communication terminal device according to claim 16, wherein the authentication detector is connected to a first terminal of a plurality of terminals in the second connector.

18. A radio-communication terminal device according to claim 17, wherein a DC voltage is connected to a second terminal of the plurality of terminals.

19. A radio-communication terminal device according to claim 16, wherein the second connector on the transceiver unit is connected to a memory writer.

20. A radio-communication terminal device according to claim 8, wherein the antenna unit further includes a first antenna connector connected to the antenna element and to a first modulator-transmitter and a first receiver-demodulator.

21. A radio-communication terminal device according to claim 20, wherein the antenna unit further includes a rectifier, connected to the first antenna connector, for feeding power to the first modulator-transmitter and the first receiver-demodulator.

22. A radio-communication terminal device according to claim 21, wherein the first modulator-transmitter and the first receiver-demodulator are connected to the authenticator.

23. A radio-communication terminal device according to claim 22, wherein the antenna unit further includes a rectifier, connected to the first antenna connector, for feeding power to the authenticator.

24. A radio-communication terminal device according to claim 20, wherein the first antenna connector connects to a second antenna connector on the transceiver unit where the second antenna connector is connected to the transmission circuit and the reception circuit and a second modulator-transmitter and a second receiver-demodulator.

25. A radio-communication terminal device according to claim 24, wherein the second receiver-demodulator is connected to the authentication controller.

26. A radio-communication terminal device according to claim 24, wherein the second transmitter-modulator is connected to a memory writer.

27. A radio-communication terminal device as recited in claim 8, wherein the transceiver unit further includes a second memory that stores the information that is stored in the authenticator.

28. A radio-communication terminal device as recited in claim 8, wherein the transceiver unit further includes a memory writer that writes the information to the authenticator.

29. A radio-communication terminal device as recited in claim 8, wherein the transceiver unit further includes a memory writer that writes the information residing in the authenticator to a memory in the transceiver unit.

30. A radio-communication terminal device as recited in claim 8, wherein the device has a controller that switches the device to an authentication detection mode.

31. A method for authenticating a connection between an antenna unit and a transceiver unit in a radio-communication terminal device, the method comprising:
- connecting the antenna to the transceiver unit;
- switching the radio-communication terminal device to an authentication detection mode;
- detecting a signal from the authenticator;
- comparing the signal from the authenticator to a signal in the authentication detector within the transceiver unit;
- sending a signal to a communication controller indicating that an authentication is detected; and
- preventing the transmission circuit from transmitting signals to the antenna unit when the communication controller determines that the authentication detector does indicate the authentication.

32. The method recited in claim 31, where detecting further comprises detecting a return voltage that was sent to the authenticator.

33. The method recited in claim 31, where detecting further comprises detecting first information in the authenticator.

34. The method recited in claim 33, where comparing further comprises comparing the first information with second information stored in the transceiver unit.

35. The method recited in claim 31, where preventing further comprises preventing the reception circuit from receiving signals from the antenna unit.

36. A method for detecting a proper connection between an antenna unit and a transceiver unit in a radio-communication terminal, the method comprising:

connecting the antenna unit to the transceiver unit;
   detecting information from an authenticator in the antenna unit;
   comparing the information from the authenticator with information stored in the transceiver unit in an authentication detector;
   sending a signal from the authentication detector to a communication controller indicating that an authentication is detected;
   preventing the transmission circuit from transmitting signals to the antenna unit when the communication controller determines that the authentication detector does not indicate the authentication.

* * * * *